UNITED STATES PATENT OFFICE.

MARIS CHAMBERS, OF BENTIVOGLIO, VIRGINIA.

IMPROVEMENT IN FLAVORING TOBACCO.

Specification forming part of Letters Patent No. 185,389, dated December 19, 1876; application filed May 31, 1876.

*To all whom it may concern:*

Be it known that I, MARIS CHAMBERS, of Bentivoglio, Albemarle county, Virginia, have invented a new and Improved Method of Flavoring Chewing Tobacco; and I do hereby declare the following to be a full and correct description of the same:

My invention consists in pulverizing or reducing dried fruits to shreds or very fine pieces, by pounding, grinding, or cutting, and then mixing the fruit thus comminuted with the leaves of tobacco, in any desired proportion, previous to the manufacture of the tobacco, for chewing, into plugs by folding and pressing in the ordinary manner, the object being to impart the flavor of the fruit employed to the tobacco, in order to render it more palatable.

I have essayed with success the use of dried peaches treated in the manner indicated; but other fruits, capable of being dried and comminuted, such as prunes, apricots, and cherries, may be substituted for peaches, to secure other desirable flavors.

I am aware that fluid extracts of licorice and other flavoring matters, in which the tobacco is soaked before folding and pressing, have long been used for imparting a desirable taste to chewing tobacco. Such a method of flavoring I do not claim.

What I claim as my invention, and desire to secure by Letters Patent, is—

Chewing-tobacco flavored by the introduction into the plug of dried and comminuted fruit, as described.

The above specification of my said invention signed and witnessed at Gordonsville this 30th day of May, A. D. 1876.

MARIS CHAMBERS.

Witnesses:
B. H. PARTLOW,
S. G. ATKINS.